Sept. 19, 1939.　　　R. J. STREIF　　　2,173,568
LIQUID SPRAY DEVICE FOR AIRPLANES
Filed Jan. 7, 1938　　　2 Sheets-Sheet 1
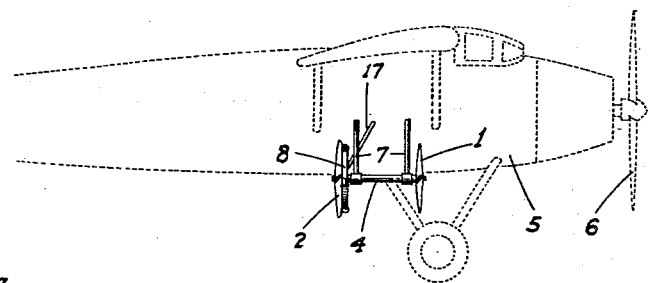
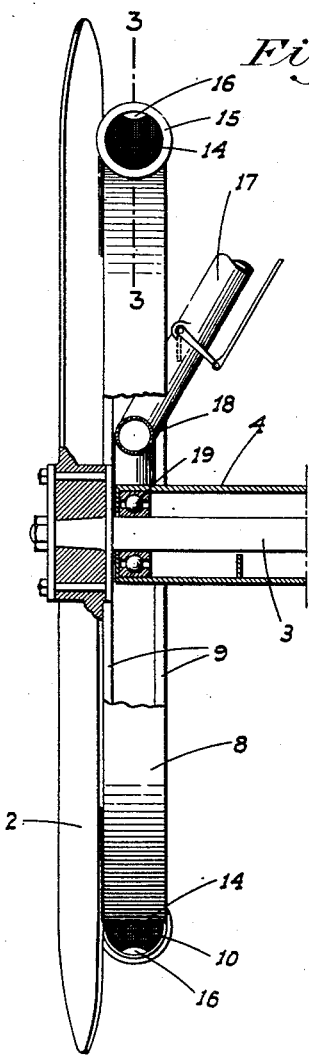
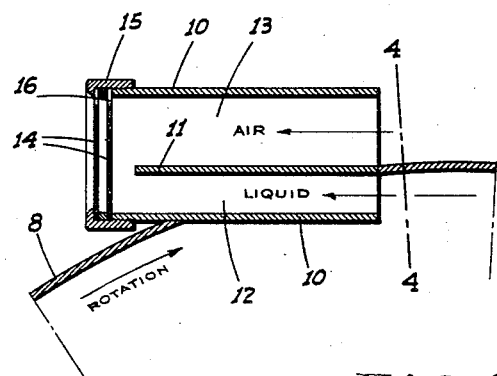
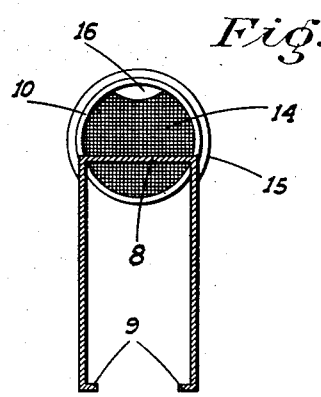
INVENTOR
*R. J. Streif*
BY
ATTORNEY Sept. 19, 1939.   R. J. STREIF   2,173,568
LIQUID SPRAY DEVICE FOR AIRPLANES
Filed Jan. 7, 1938   2 Sheets-Sheet 2

*Fig.5*

INVENTOR
*R. J. Streif*
BY
ATTORNEY

Patented Sept. 19, 1939

2,173,568

UNITED STATES PATENT OFFICE 2,173,568

LIQUID SPRAY DEVICE FOR AIRPLANES

Robert J. Streif, Modesto, Calif.

Application January 7, 1938, Serial No. 183,805

8 Claims. (Cl. 244—136)

This invention relates to the forming and disbursing of a liquid spray in fog like form over orchards and like agricultural areas by means of an airplane flying over such areas.

The principal object of my invention is to provide a device for the purpose, adapted to be mounted on the airplane and to be operated by the air stream from the propeller, so constructed that the minimum number of moving parts is used, and wear and the possibility of trouble developing in service is minimized.

A further object is to provide a device of this character having liquid feed means so arranged as to insure a very even distribution of the liquid to the rotary unit and the spray forming nozzles thereon.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a fragmentary outline of an airplane showing my improved spray disburser mounted thereon.

Figure 2 is a side elevation, partly in section of the main rear portion of the device.

Figure 3 is a fragmentary enlarged section on line 3—3 of Fig. 2.

Figure 4 is a cross section on line 4—4 of Fig. 3.

Figure 5 is a front elevation of the rear portion of the device, detached.

Referring now more particularly to the characters of reference on the drawings, the driving unit of the device comprises front and rear propellers 1 and 2 connected by a shaft 3. This shaft is turnably enclosed in a housing 4 which is secured to the airplane 5 on one side thereof and rearwardly of the propeller 6 so that the shaft 3 extends lengthwise of the airplane by suitable means such as struts 7. It will be understood that at least a pair of the units is mounted on the airplane, one on each side, in corresponding locations.

Disposed immediately in front of the rear propeller 2 is an endless circular conduit 8, preferably rectangular in cross section and open about its inner periphery except for relatively small side flanges 9. This conduit is concentric with the shaft 3, and approaches the propeller in diameter. It abuts against the leading edges of the blades of propeller 2 and is suitably secured thereto so as to be rigid therewith. If the blades are metal, as is preferred (and as is the conduit) welding is the securing means employed.

Projecting tangentially from the outer periphery of the conduit and located adjacent the various blades of the propeller are the tubular air and liquid intake, mixing and discharge nozzles. Each nozzle comprises an open ended tube 10 projecting at one end into the conduit to about a third of its diameter and in the same direction as that in which the conduit rotates and which is determined by the direction of rotation of the propeller unit.

A transverse longitudinally extending partition 11 in the tube projects toward the opposite end of the tube from said one end thereof, where it joins and practically forms an unbroken tangential extension of the outer peripheral wall of the conduit. The nozzle tube is thus divided into a pair of spaced chambers 12 and 13, the former being in communication at said one end of the tube with the interior of the conduit, and the latter at said end being exposed to the air outwardly of the conduit. The opposite end of the tube is entirely outside the conduit, and is covered with a pair or more of removable fine mesh screens 14 held in place by a cap 15. A portion of the screens at the point furthest from the outer periphery of the conduit—or from the central shaft—is cut away to leave an unobstructed opening 16 for the purpose which will be shown.

By reason of the above described structure, it will be seen that if liquid is fed into the revolving conduit from its inner open periphery, such liquid upon contacting with a wall of the conduit will be thrown centrifugally against the outer peripheral wall. The liquid naturally moving at a slower speed than the conduit and nozzles, will be drawn into the liquid chambers 12 of the latter. At the same time, as the nozzles turn, air will be taken into corresponding ends of the outer chambers 13. At the termination of the partition 11, which is ahead of the screens, the air and liquid become mingled, and upon passing through the screens are intimately mixed together and are discharged in the form of a fine spray or fog. The liquid used for spray purposes frequently contains lead or other heavy matter which tends to precipitate and which is incapable of passing through screens 14. Any such precipitated matter, upon leaving the outer ends of chambers 12 is at once thrown centrifugally to the radially outermost wall of the nozzle tubes.

Such matter is then in direct alinement with the screen openings 16, and will be discharged through the same without clogging the screens. The size of these openings however is not sufficiently large to allow of any appreciable amount of the mixture itself passing into the atmosphere.

The liquid is fed into the conduit in an even manner at horizontally opposed points simultaneously by the following means: Extending downwardly toward the conduit from the supply tank on the airplane is a feed pipe 17. This is connected, directly above and in line with shaft 3, with a downwardly curved transverse or lateral pipe 18 at the center of length thereof, this pipe 18 lying within the circular area defined by the conduit. This pipe 18 terminates at both ends within the conduit 8 a certain distance substantially in horizontal alinement with shaft 3 as shown in Fig. 5. It will therefore be seen that liquid in equal volumes will be fed into the conduit, so as to better insure all the nozzles receiving equal supplies of the liquid.

It will also be seen that by reason of the manner in which feeding connection between the conduit and pipe 18 is made, I avoid the need of packed joints or closely fitted parts, since the liquid will never tend to drop from the open inner side of the conduit, due to centrifugal action, and the possible mingling of air with the liquid while the latter is within the conduit will do no harm. The only parts of the structure requiring careful and close fitting are the shaft 3 and its bearings 19 within the sleeve 4—and such features seldom if ever give any trouble as is well known.

The use of the two spaced propellers 1 and 2 secured together as a unit provides the necessary power for operating the disburser without necessitating the use of an unduly large propeller.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A liquid spray device for airplanes comprising an endless circular conduit disposed in a substantially vertical plane, means to rotate the conduit by the air stream set up by the movement of the airplane, a discharge nozzle connected to the conduit and projecting from the outer periphery thereof, the conduit being open all about its inner periphery, a gravity-feed supply pipe terminating above the horizontal center of the conduit and gravity-feed branches connected to the pipe at said termination and extending downwardly to open terminations within the conduit substantially in the central horizontal plane thereof, said branches projecting through the inner peripheral opening of the conduit.

2. A liquid spray device for airplanes comprising an endless circular conduit disposed in a substantially vertical plane, means to rotate the conduit by the air stream set up by the movement of the airplane, means to feed liquid into the conduit and a discharge nozzle connected to the conduit and projecting from the outer periphery thereof; said nozzle comprising a tubular body and means dividing the body into a pair of longitudinal chambers communicating with each other only adjacent the outer end of the body; one chamber at the inner end of the body communicating with the interior of the conduit and the other chamber at the inner end of the body being open to atmosphere, and a mixing device at the outer end of the body.

3. A structure as in claim 2, in which said mixing device comprises a fine-mesh screen unit across the body at its outer end.

4. A liquid spray device for airplanes comprising an endless circular conduit disposed in a substantially vertical plane, a discharge nozzle connected to the conduit and projecting from the outer periphery thereof, means to feed liquid into the conduit and means to rotate the conduit by the air stream set up by the movement of the airplane; said conduit rotating means comprising a propeller adapted to be mounted on the airplane concentric with the conduit and against the blades of which the conduit abuts in secured relation.

5. A liquid spray device for airplanes comprising an endless circular conduit disposed in a substantially vertical plane, means to rotate the conduit by the air stream set up by the movement of the airplane, means to feed liquid into the conduit, a discharge nozzle connected to the conduit and projecting from the outer periphery thereof; said nozzle comprising a tubular body cutting into the outer periphery of the body substantially tangent thereto, the outer end of the body facing away from the direction of rotation of the conduit, a transverse partition extending lengthwise of the body from its opposite end and forming a substantially tangential extension of the outer peripheral wall of the conduit, the corresponding end portion of the body radially outward of the partition being open to atmosphere, and a fine mesh screen across the body at said outer end.

6. A liquid spray device for attachment to an airplane comprising a tubular open ended body, means mounting said body for rotation about a substantially horizontal axis to a radial line from which the body is substantially tangent, means to rotate the body by the air stream set up by the movement of the air stream, a transverse partition in the body, said partition terminating short of that end of the body which faces opposite the direction of rotation thereof, means to feed liquid into one chamber formed by the partition, the other chamber at the opposite end of the body being open to atmosphere, and a screen unit across the body at the first named end thereof.

7. A structure as in claim 6, in which the screen unit is provided with an opening therethrough at the radially outermost point thereof.

8. A structure as in claim 6, in which an opening larger than those formed by the mesh of the screen is provided from the body adjacent the screen at the radially outermost point thereof.

ROBERT J. STREIF.